US008734024B2

(12) United States Patent
Isenhour et al.

(10) Patent No.: US 8,734,024 B2
(45) Date of Patent: May 27, 2014

(54) OPTICAL COUPLINGS HAVING A CODED MAGNETIC ARRAY, AND CONNECTOR ASSEMBLIES AND ELECTRONIC DEVICES HAVING THE SAME

(75) Inventors: Micah C. Isenhour, Linconton, NC (US); Dennis M. Knecht, Hickory, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 150 days.

(21) Appl. No.: 13/305,238

(22) Filed: Nov. 28, 2011

(65) Prior Publication Data

US 2013/0136400 A1 May 30, 2013

(51) Int. Cl.
*G02B 6/38* (2006.01)
(52) U.S. Cl.
USPC .......................................................... 385/57
(58) Field of Classification Search
USPC .......................................................... 385/57
See application file for complete search history.

(56) References Cited

U.S. PATENT DOCUMENTS

| | | | |
|---|---|---|---|
| 4,213,677 A | 7/1980 | Sugimoto et al. | 350/96.18 |
| 4,268,112 A | 5/1981 | Peterson | 350/96.18 |
| 4,636,032 A * | 1/1987 | Grego | 385/57 |
| 4,641,915 A * | 2/1987 | Asakawa et al. | 385/26 |
| 4,701,011 A | 10/1987 | Emkey et al. | 350/96.18 |
| 5,085,062 A * | 2/1992 | Capdevila | 70/276 |
| 5,172,271 A | 12/1992 | Sinclair | 359/652 |
| 5,384,874 A | 1/1995 | Hirai et al. | 385/34 |
| 5,784,512 A | 7/1998 | Hensen | 385/61 |
| 5,832,153 A | 11/1998 | Duck | 385/34 |
| 5,850,493 A | 12/1998 | Cheng | 385/34 |
| 5,923,802 A | 7/1999 | Giebel et al. | 385/76 |
| 6,012,852 A | 1/2000 | Kadar-Kallen et al. | 385/74 |
| 6,033,125 A | 3/2000 | Stillie et al. | 385/75 |
| 6,157,485 A | 12/2000 | Cheng | 359/495 |

(Continued)

FOREIGN PATENT DOCUMENTS

| | | | | |
|---|---|---|---|---|
| AU | 199898138 B2 | 8/1999 | | G02B 6/32 |
| EP | 258569 A2 * | 3/1988 | | |

(Continued)

OTHER PUBLICATIONS

W. J. Tomlinson, "Applications of GRIN-rod lenses in optical fiber communications systems," Applied Optics, Apr. 1, 1980, vol. 19, No. 7, pp. 1127-1138.

(Continued)

*Primary Examiner* — Charlie Peng

(57) ABSTRACT

Optical couplings for optically coupling one or more devices are disclosed. According to one embodiment, an optical coupling includes an optical coupling body, an optical interface, and a coded magnetic array located at the optical coupling body. The coded magnetic array has a plurality of magnetic regions configured for mating the optical interface. The optical coupling further includes a reflective surface within the optical coupling body and positioned along an optical path of the optical coupling body. The reflective surface is operable to redirect an optical signal propagating within the optical coupling body such that it propagates through the optical interface. The optical coupling may be configured as a plug, such as a plug of a connector assembly, or as a receptacle, such as a receptacle on an electronic device. Connector assemblies of optical cables, optical coupling receptacles, and translating shutter assemblies are also disclosed,

19 Claims, 12 Drawing Sheets

(56) References Cited

U.S. PATENT DOCUMENTS

| | | | |
|---|---|---|---|
| 6,246,026 B1 | 6/2001 | Vergeest | 219/121.72 |
| 6,542,665 B2 | 4/2003 | Reed et al. | 385/34 |
| 6,632,025 B2 | 10/2003 | Ukrainczyk | 385/70 |
| 6,655,850 B2 | 12/2003 | Mann et al. | 385/74 |
| 6,687,434 B2 | 2/2004 | Ishikawa | 385/34 |
| 6,736,547 B2 | 5/2004 | Stevens et al. | 385/61 |
| 6,837,625 B2 | 1/2005 | Schott et al. | 385/60 |
| 6,899,464 B2 | 5/2005 | Stevens et al. | 385/53 |
| 6,963,687 B2 | 11/2005 | Vergeest et al. | 385/123 |
| 7,077,576 B2 | 7/2006 | Luther et al. | 385/59 |
| 7,104,701 B1 | 9/2006 | Durrant et al. | 385/74 |
| 7,329,050 B1 | 2/2008 | Dugan et al. | 385/55 |
| 7,346,236 B2 | 3/2008 | Asano et al. | 385/34 |
| 7,346,237 B2 | 3/2008 | Matsumura et al. | 385/34 |
| 7,357,005 B2 | 4/2008 | Matsumura et al. | 65/387 |
| 7,460,750 B2 | 12/2008 | Durrant et al. | 385/35 |
| 7,522,793 B2 | 4/2009 | Drabarek et al. | 385/52 |
| 7,572,071 B1 | 8/2009 | Wu | 385/94 |
| 7,603,008 B2 | 10/2009 | Matsumura et al. | 385/35 |
| 7,681,256 B2 | 3/2010 | Fullerton et al. | 2/410 |
| 7,724,113 B2 | 5/2010 | Fullerton et al. | 335/306 |
| 7,724,114 B2 | 5/2010 | Fullerton et al. | 335/306 |
| 7,746,205 B2 | 6/2010 | Fullerton et al. | 335/306 |
| 7,750,773 B2 | 7/2010 | Fullerton et al. | 335/285 |
| 7,750,774 B2 | 7/2010 | Fullerton et al. | 335/285 |
| 7,750,777 B2 | 7/2010 | Fullerton et al. | 335/306 |
| 7,750,778 B2 | 7/2010 | Fullerton et al. | 335/306 |
| 7,750,779 B2 | 7/2010 | Fullerton et al. | 335/306 |
| 7,750,780 B2 | 7/2010 | Fullerton et al. | 335/306 |
| 7,750,781 B2 | 7/2010 | Fullerton et al. | 335/306 |
| 7,755,462 B2 | 7/2010 | Fullerton et al. | 335/306 |
| 7,760,058 B2 | 7/2010 | Fullerton et al. | 335/285 |
| 7,772,951 B2 | 8/2010 | Fullerton et al. | 335/306 |
| 7,772,952 B2 | 8/2010 | Fullerton et al. | 335/306 |
| 7,775,725 B2 | 8/2010 | Grinderslev | 385/74 |
| 7,800,348 B2 | 9/2010 | Zargari | 335/284 |
| 7,800,471 B2 | 9/2010 | Fullerton et al. | 335/306 |
| 7,800,472 B2 | 9/2010 | Fullerton et al. | 335/306 |
| 7,800,473 B2 | 9/2010 | Fullerton et al. | 335/306 |
| 7,808,348 B2 | 10/2010 | Fullerton et al. | 335/306 |
| 7,808,349 B2 | 10/2010 | Fullerton et al. | 335/306 |
| 7,808,350 B2 | 10/2010 | Fullerton et al. | 335/306 |
| 7,812,697 B2 | 10/2010 | Fullerton et al. | 335/306 |
| 7,812,698 B2 | 10/2010 | Fullerton et al. | 335/306 |
| 7,817,002 B2 | 10/2010 | Fullerton et al. | 335/306 |
| 7,817,003 B2 | 10/2010 | Fullerton et al. | 335/306 |
| 7,817,004 B2 | 10/2010 | Fullerton et al. | 335/306 |
| 7,817,005 B2 | 10/2010 | Fullerton et al. | 335/306 |
| 7,817,006 B2 | 10/2010 | Fullerton et al. | 335/306 |
| 7,821,367 B2 | 10/2010 | Fullerton et al. | 335/306 |
| 7,823,224 B2 | 11/2010 | Fullerton et al. | 2/410 |
| 7,823,300 B2 | 11/2010 | Fullerton et al. | 36/113 |
| 7,824,083 B2 | 11/2010 | Fullerton et al. | 362/398 |
| 7,834,728 B2 | 11/2010 | Fullerton et al. | 335/296 |
| 7,834,729 B2 | 11/2010 | Fullerton et al. | 335/306 |
| 7,839,244 B2 | 11/2010 | Fullerton et al. | 335/284 |
| 7,839,245 B2 | 11/2010 | Fullerton et al. | 335/296 |
| 7,839,246 B2 | 11/2010 | Fullerton et al. | 335/306 |
| 7,839,247 B2 | 11/2010 | Fullerton et al. | 335/306 |
| 7,839,248 B2 | 11/2010 | Fullerton et al. | 335/306 |
| 7,841,776 B2 * | 11/2010 | DiFonzo et al. | 385/57 |
| 7,843,294 B2 | 11/2010 | Fullerton et al. | 335/296 |
| 7,843,295 B2 * | 11/2010 | Fullerton et al. | 335/306 |
| 7,843,296 B2 | 11/2010 | Fullerton et al. | 335/306 |
| 7,843,297 B2 | 11/2010 | Fullerton et al. | 335/306 |
| 7,855,624 B2 | 12/2010 | Fullerton et al. | 335/306 |
| 7,864,009 B2 | 1/2011 | Fullerton et al. | 335/306 |
| 7,864,010 B2 | 1/2011 | Fullerton et al. | 335/306 |
| 7,864,011 B2 | 1/2011 | Fullerton et al. | 335/306 |
| 7,868,721 B2 | 1/2011 | Fullerton et al. | 335/284 |
| 7,889,038 B2 | 2/2011 | Fullerton et al. | 335/306 |
| 7,893,803 B2 | 2/2011 | Fullerton et al. | 335/285 |
| 7,956,711 B2 | 6/2011 | Fullerton et al. | 335/285 |
| 7,956,712 B2 | 6/2011 | Fullerton et al. | 335/285 |
| 7,958,575 B2 | 6/2011 | Fullerton et al. | 4/242.1 |
| 7,961,068 B2 | 6/2011 | Fullerton et al. | 335/306 |
| 7,961,069 B2 | 6/2011 | Fullerton et al. | 335/306 |
| 7,963,818 B2 | 6/2011 | Fullerton et al. | 446/93 |
| 7,982,568 B2 | 7/2011 | Fullerton et al. | 335/306 |
| 8,015,752 B2 | 9/2011 | Fullerton et al. | 49/70 |
| 8,016,330 B2 | 9/2011 | Fullerton et al. | 292/251.5 |
| 8,035,260 B2 | 10/2011 | Fullerton et al. | 310/49.01 |
| 2002/0146211 A1 | 10/2002 | Stevens et al. | 385/61 |
| 2003/0012513 A1 | 1/2003 | Ukrainczyk | 385/61 |
| 2003/0021543 A1 | 1/2003 | Mann et al. | 385/74 |
| 2004/0009697 A1 | 1/2004 | Clark et al. | 439/362 |
| 2006/0072878 A1 * | 4/2006 | Dames et al. | 385/47 |
| 2006/0222299 A1 | 10/2006 | Durrant et al. | 385/74 |
| 2008/0050072 A1 | 2/2008 | Durrant et al. | 385/74 |
| 2008/0122579 A1 * | 5/2008 | German et al. | 340/10.1 |
| 2008/0279509 A1 | 11/2008 | Durrant et al. | 385/72 |
| 2009/0041412 A1 | 2/2009 | Danley et al. | 385/85 |
| 2009/0249612 A1 | 10/2009 | Fullerton et al. | 29/602.1 |
| 2009/0250032 A1 | 10/2009 | Fullerton et al. | 123/143 B |
| 2009/0324175 A1 | 12/2009 | Everett et al. | 385/72 |
| 2009/0324176 A1 | 12/2009 | Cheng et al. | 385/73 |
| 2010/0027943 A1 | 2/2010 | Armani et al. | 385/74 |
| 2010/0080563 A1 | 4/2010 | DiFonzo et al. | 398/115 |
| 2010/0104244 A1 | 4/2010 | Grinderslev | 385/74 |
| 2010/0215325 A1 | 8/2010 | Tamura et al. | 385/89 |
| 2010/0225430 A1 | 9/2010 | Fullerton et al. | 335/306 |
| 2012/0099822 A1 | 4/2012 | Kuffel et al. | 385/78 |
| 2012/0155803 A1 * | 6/2012 | Benjamin et al. | 385/33 |

FOREIGN PATENT DOCUMENTS

| | | | | |
|---|---|---|---|---|
| EP | 1447695 A2 | | 8/2004 | G02B 6/42 |
| JP | 58209705 A | * | 12/1983 | |
| JP | 59037511 A | * | 3/1984 | |
| JP | 63-293510 | | 11/1988 | G02B 6/42 |
| WO | WO 00/74277 A1 | | 12/2000 | H04B 10/00 |
| WO | WO01/11409 A2 | | 2/2001 | G02B 23/24 |
| WO | WO03/076993 A1 | | 9/2003 | G02B 6/32 |
| WO | WO 2008/058505 A1 | | 5/2008 | G02B 6/38 |

OTHER PUBLICATIONS

Emkey, et al., "Analysis and Evaluation of Graded-Index Fiber-Lenses," Journal of Lightwave Technology, vol. LT-5, No. 9, Sep. 1987, pp. 1156-1164.

Palais, Joseph C, "Fiber coupling using graded-index rod lenses," Applied Optics, Jun. 15, 1980, vol. 19, No. 12, pp. 2011-2018.

http:\\www.cvimellesgroit.com, "Gradient-Index Lenses".

Chanclou, et al., "Design and demonstration of a multicore single-mode fiber coupled lens device," Optics Communications 233, 2004, pp. 333-339.

Senior, et al., "Misalignment losses at multimode graded-index fiber splices and GRIN rod lens couplers," Applied Optics, Apr. 1, 1985, vol. 24, No. 7, pp. 977-983.

Gilsdorf, et al., "Single-mode fiber coupling efficiency with graded-index rod lenses," Applied Optics, Jun. 1, 1994, vol. 33, No. 16, pp. 3440-3445.

Cusworth, et al., "Angular tilt misalignment loss at a GRIN rod lens coupler," Applied Optics, Jun. 1, 1986, vol. 25, No. 11, pp. 1775-1779.

Patent Cooperation Treaty, International Search Report and Written Opinion, May 24, 2011, 8 pgs.

Patent Cooperation Treaty, International Search Report and Written Opinion for International Application No. US/PCT2012/066033; Mailing Date Feb. 27, 2013—14 pages.

* cited by examiner

OPTICAL COUPLINGS HAVING A CODED MAGNETIC ARRAY, AND CONNECTOR ASSEMBLIES AND ELECTRONIC DEVICES HAVING THE SAME

BACKGROUND

1. Field

The present disclosure is directed to optical couplings and, more particularly, to optical couplings having a coded magnetic array. The optical coupling may be configured as a plug or a receptacle to optically couple optical components.

2. Technical Background

Fiber optic cables have advantages over conventional copper conductor cables, especially as data rates increase due to bandwidth limitations of copper cables. As a result, fiber optic cables have replaced much of the copper cables in communication networks and is migrating into other application spaces. As the use of fiber optics migrates into numerous consumer electronics applications, such as connecting computer peripherals by the use of fiber optic cable assemblies, there will be a consumer-driven expectation for cables having improved performance, compatibility with future communication protocols, and a broad range of use. Unlike telecommunication optical connections, consumer applications experience a large number of mating and unmating cycles that may cause issues with reliability and performance over the desired number of mating cycles. For instance, conventional opto-mechanical interfaces utilized to optically couple an optical cable assembly to active optical components of an electronic device require precise mechanical structures to properly align the optical fibers of the optical cable assembly with the laser(s) and/or photodiode(s) of the electronic device. Consequently, conventional opto-mechanical interfaces require tight tolerances for alignment that are expensive, may not be rugged enough for consumer electronics applications, and/or will have degraded performance over the desired number of mating cycles. For instance, the mechanical structures often cause the optical interface of the optical cable assembly and the electronic device to be susceptible to the build-up of foreign substances (e.g., dust, liquid, food particles, etc.) that may interfere with the mating and propagation of optical signals between the optical cable assembly and the electronic device.

Accordingly, alternative optical couplings, connector assemblies and electronic devices are desired.

SUMMARY

Embodiments of the present disclosure relate to optical couplings for optical communication, such as optical couplings utilized by optical cable assemblies and electronic devices. As an example, an optical cable assembly may comprise an optical coupling at each end that is configured to mate with corresponding optical couplings of electronic devices so that two (or more) coupled electronic devices may communicate with one another via optical signals over the optical cable assembly.

More specifically, embodiments are directed to optical couplings comprising an optical coupling surface and a magnetic coupling surface. The magnetic coupling surface includes a coded magnetic array, and the optical coupling surface includes an optical interface that may include a fiber end, a lens component (e.g., refractive lens, a gradient index lens, a diffractive component, and the like), and/or an active optical component. The optical coupling may be configured as a plug or a receptacle. The coded magnetic array allows for a first optical coupling of a first device to be mated to a second optical coupling of a second device. In one embodiment, a translating shutter assembly is provided within an optical coupling receptacle such that the optical coupling receptacle is closed to the environment when a plug is not inserted. Such optical couplings may be free from significant mechanical alignment features that can cause the build-up of foreign substance, such as dust and liquids.

According to one aspect of the disclosure, an optical coupling includes an optical coupling body, an optical interface, and a coded magnetic array located at the optical coupling body. The coded magnetic array has a plurality of magnetic regions configured for mating the optical interface. The optical coupling further includes a reflective surface within the optical coupling body and positioned along an optical path of the optical coupling body. The reflective surface is operable to redirect an optical signal propagating within the optical coupling body such that it propagates through the optical interface.

According to another aspect of the disclosure, a connector assembly includes a plug ferrule coupled to a fiber optic cable. The plug ferrule includes an optical interface, a coded magnetic array with a plurality of magnetic regions for mating the optical interface, a fiber bore within the plug ferrule, and a reflective surface. The reflective surface is positioned within the plug ferrule along an optical path extending from the fiber bore. The reflective surface is operable to redirect an optical signal propagating within the plug ferrule such that it propagates through the optical interface. The fiber optic cable includes an optical fiber positioned within the fiber bore of the plug ferrule.

According to yet another aspect of the disclosure, an optical coupling receptacle includes an opening for receiving a plug ferrule of a connector assembly, an optical coupling surface having an optical interface that includes an active optical component, and a coded magnetic array having a plurality of magnetic regions for mating the optical interface. The optical coupling surface is substantially orthogonal with respect to the opening such that an optical signal propagating within the optical coupling receptacle experiences an optical turn.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference is now made in detail to the preferred embodiments of the disclosure, examples of which are illustrated in the accompanying drawings. Whenever possible, like reference numbers are used to refer to like components or parts. Cartesian coordinates are shown in some Figures by way of reference.

The optical couplings and optical cable assemblies described herein are suitable for making optical or optical and electrical connections for a variety of devices, and are particularly well suited for consumer electronic devices (e.g., smart phones, portable storage devices, media players, display devices, and the like). The concepts of the present disclosure may advantageously allow for the simple, quick and economical connection and disconnection of connector assemblies of optical cable assemblies for a relatively large number of mating cycles.

As used herein, the term "electronic device" means a device that has either electronic or optical and electronic components and functionality, including a fiber optic interface device and associated hardware configured to receive, transmit, or both transmit and receive optical signals. It is noted that the phrase "optical coupling" may refer generically to a male plug (e.g., a plug of an optical connector assembly of an optical cable assembly) or a female receptacle (e.g., a receptacle of an electronic device configured to receive a male plug). Further, terms such as vertical, horizontal, upward, downward, top, bottom, side, etc. are used for convenience of description in order to describe relative directions, orientations, etc., and are not intended to be limiting with regard to a particular direction, orientation, etc.

Generally, embodiments are directed to optical couplings, such as optical couplings utilized by optical cable assemblies and electronic devices, wherein electrical signals generated by a host or client electronic device are converted to optical signals by a transceiver circuit and transmitted over one or more optical fibers. Optical signals received by a host or a client electronic device are converted from optical signals into electrical signals by the transceiver circuit. Embodiments described herein are directed to optical couplings that may align optical components of coupled devices (e.g., optical fibers and/or active optical components, such as laser and photodiodes) without significant mechanical structure. As described in detail below, embodiments use one or more coded magnetic arrays to precisely align optical components of the coupled devices. Optical couplings, as well as optical cable assemblies, connector assemblies, and electronic devices, will be described in further detail herein with specific reference to the appended figures.

Figure 1:
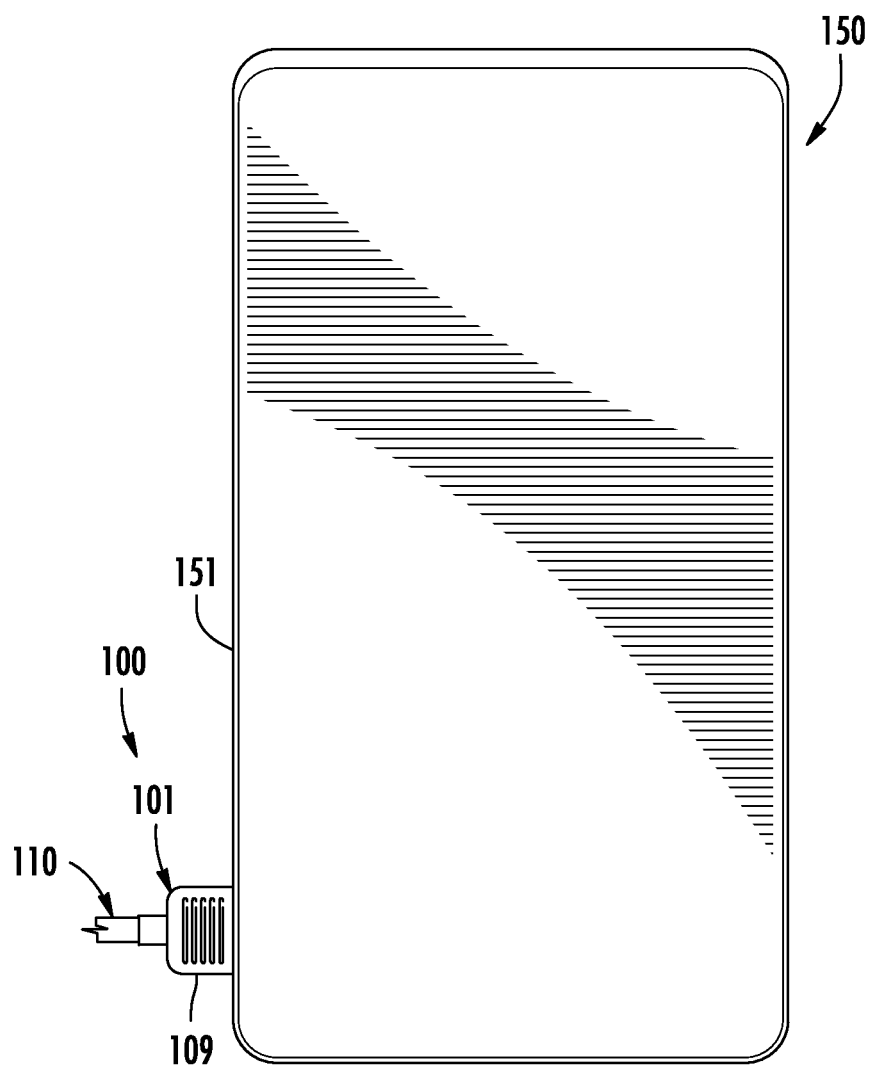
FIG. 1 schematically depicts a top view of an exemplary connector assembly coupled to an exemplary electronic device according to one or more embodiments shown and described herein.

Referring initially to FIG. 1, an electronic device 150 and an optical cable assembly 100 are illustrated in a coupled relationship according to one embodiment. As described in detail below, the electronic device 150 and the optical cable assembly 100 are optically coupled via an optical coupling on both the electronic device 150 and the optical cable assembly 100. The electronic device 150 may be any electronic device, including, but not limited to, a portable media player, a cellular phone (e.g., a "smart phone") a data storage device (e.g., an external hard drive or a flash-based memory device), a digital camera, a personal, laptop, notebook, or tablet computer, a camcorder, a mobile electronic device, a server, etc.

The electronic device 150 may be any electronic device wherein data is transferred between one electronic device and another electronic device.

Generally, the electronic device 150 may have an external housing that comprises a coupling face 151, such as a housing surface of the electronic device 150. The coupling face 151 of the electronic device 150 is the surface on which an optical cable assembly 100 may be optically coupled. The optical cable assembly 100 may generally comprise a connector assembly 101 having connector housing 109 and an optical cable 110.

Figure 2A:
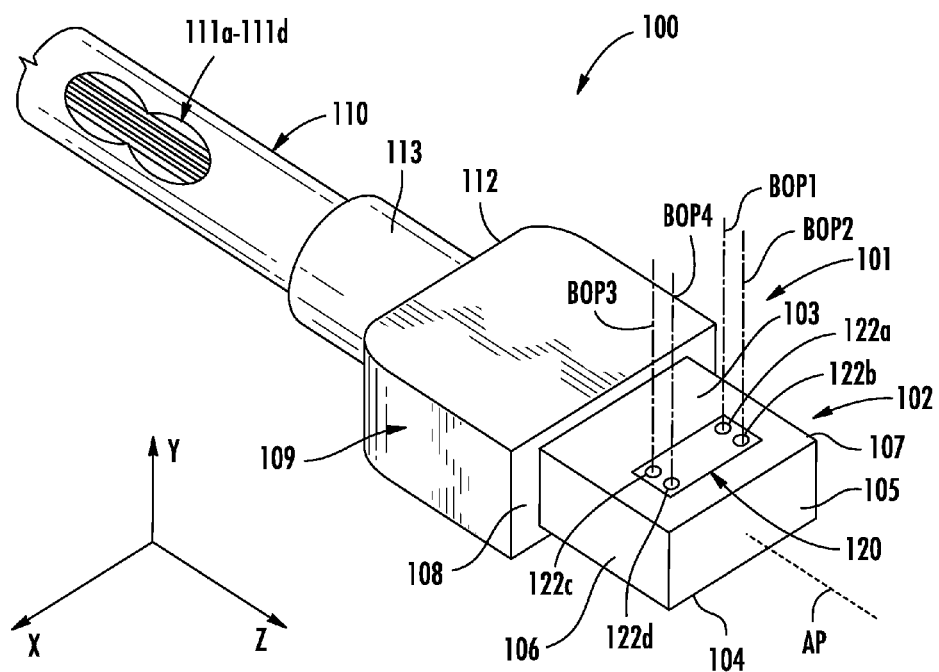
FIG. 2A schematically depicts a top elevated view of an exemplary connector assembly according to one or more embodiments shown and described herein.
Figure 2B:
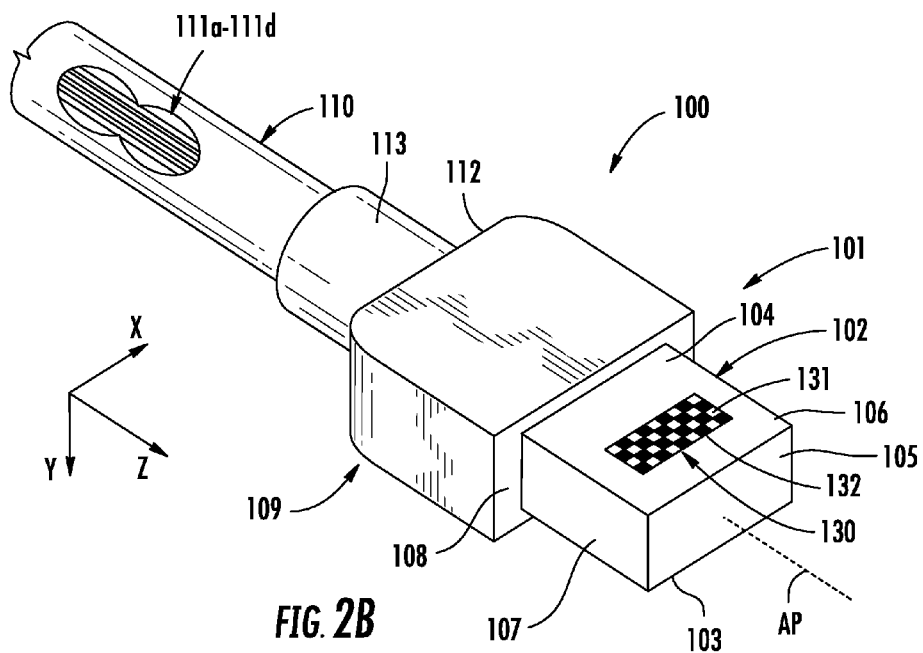
FIG. 2B schematically depicts a bottom elevated view of the exemplary connector assembly depicted in FIG. 2A according to one or more embodiments shown and described herein.
Figure 2C:
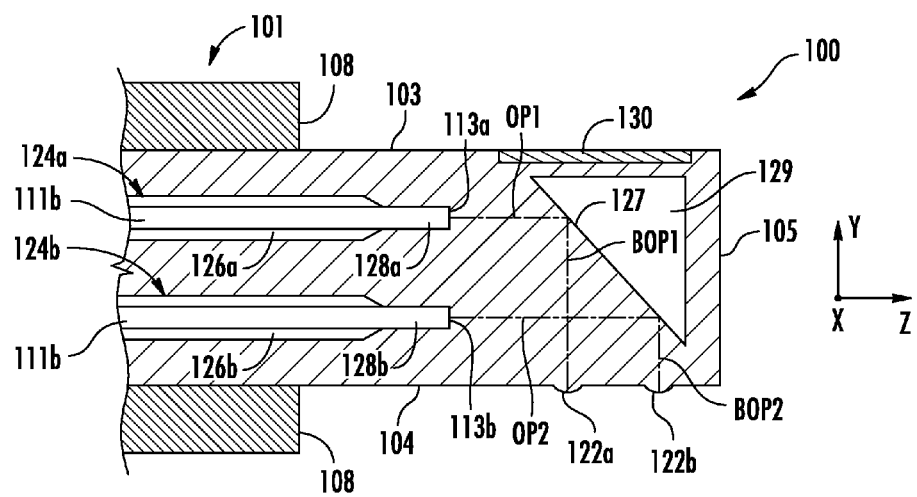
FIG. 2C schematically depicts a cross-sectional view of a connector assembly according to one or more embodiments shown and described herein.

Referring now to FIGS. 2A-2C, FIG. 2A is a top-down elevated view of a connector assembly 101 of an optical cable assembly 100 according to one embodiment; FIG. 2B is a bottom-up elevated view of the connector assembly 101 depicted in FIG. 2A; and FIG. 2C is a cross-sectional view of the connector assembly 101 depicted in FIG. 2A. The optical cable assembly 100 generally comprises the connector assembly 101 and an optical cable 110. The optical cable 110 carries at least one optical fiber (e.g., optical fibers 111a-111d), and optionally carries at least one electrical wire (not shown) to provide electrical power over the optical cable assembly.

The connector assembly 101 comprises a connector housing 109 having a front end 108 and a rear end 112, wherein the optical cable 110 is coupled to the rear end 112 of the connector housing 109. In some embodiments, the rear end 112 may contain strain-relief features 113. The optical fiber(s) may pass into the connector housing 109 by any appropriate means, such as through a bore within the connector housing 109, for example. The connector assembly 101 further comprises an optical coupling 102 configured as a male connector plug defined by a plug ferrule. The optical coupling of the connector assembly is referred to as a "plug ferrule" hereinbelow for ease of discussion and to distinguish between other optical couplings, such as receptacles, as introduced below with respect to an electronic device 150. In the illustrated embodiment, the plug ferrule 102 extends from the front end 108 of the connector housing 109, wherein the connector housing 109 supports the plug ferrule 102.

With reference to FIGS. 2A and 2B, the optical coupling provided by the plug ferrule 102 comprises an optical coupling surface 103, a magnetic coupling surface 104, a front surface 105, a first sidewall 106, and a second sidewall 107. The plug ferrule 102 has a plug ferrule axis AP from the front surface 105 of the plug ferrule 102. Referring specifically to FIG. 2A, the optical coupling surface 103 (i.e., a plug optical coupling surface) has an optical interface 120 (i.e., a plug optical interface) that is configured to receive and transmit optical signals to and from the optical cable assembly 100. As described in detail below, the plug optical interface 120 of the plug ferrule 102 is configured to be substantially aligned with an optical interface of an electronic device when the connector assembly 101 is inserted into a receptacle of an electronic device. At least a portion of the optical interface 120 is optically transmissive such that optical signals may be therethrough. In the illustrated embodiment, the optical interface 120 includes four optional lens components 122a-122d configured to expand or focus the optical signals propagating within the optical fibers to enhance optical coupling with the active components (e.g., fiber ends, lasers and/or photodiodes) of a mated optical coupling. It should be understood that more or fewer lens components may be provided as the number of lens components may depend on the number of optical fibers (and therefore, optical channels) within the optical cable 110.

In the illustrated embodiment, the lens components 122a-122d are located behind an optically transmissive cover 121 that may protect the lens components. In one embodiment, the optically transmissive cover 121 comprises a strengthened glass sheet, such as Corning® Gorilla® glass; however, other optically transmissive materials may be used, such as plastic materials and other glass materials. In an alternative embodiment, the lens components 122a-122d may be integrated within the optically transmissive cover 121 as one component. In yet another embodiment, the lens components 122a-122d are integrated within the plug ferrule 102 as a single component such that the plug ferrule 102 does not include an optically transmissive cover 121 (see FIG. 2C). In still yet another embodiment, the optical interface 120 does not include any lens components.

As described in more detail below, the plug ferrule 102 provides for a bent optical path BOP (e.g., BOP1-BOP4), wherein optical signals propagating within the plug ferrule 102 are redirected ninety degrees (or some other angle). The bent optical paths BOP1-BOP4 are aligned with the lens components 122a-122d, respectively, such that optical signals propagating within the optical fibers 111a-111d are provided to/from the lens components 122a-122d.

Referring now to FIG. 2C, a cross-sectional view of the plug ferrule 102 and the connector housing 109 depicted in FIG. 2A is illustrated. The exemplary plug ferrule 102 includes internal bores (e.g., first bore 124a and second bore 124b) configured to receive an optical fiber 111a, 111b. The internal bores 124a, 124b may include an insertion portion 126a, 126b and a tight-fitting portion 128a, 128b. The insertion portion 126a, 126b may have an internal diameter that is larger than a diameter of the optical fibers 111a-111d so that the optical fibers are easily inserted into the internal bores during fabrication. The tight fitting-portion 128a, 128b may have an internal diameter that is substantially equal to the diameter of the optical fibers 111a-111d such that the optical fibers may be securely maintained and precisely located within internal bores. A fiber end (e.g., fiber end 113a and fiber end 113b) of each optical fiber may be located at the end of the respective internal bore 124 such that the fiber end is located at a desired location along the z-axis. The optical fibers may then be secured within the internal bores by an appropriate adhesive. Other fiber securing configurations are also possible, such as the use of internal bores having a single diameter, for example.

As shown in FIG. 2C, the plug ferrule 102 may comprise an interior angled wall 127 configured as an internal angled reflective surface to redirect optical signals propagating within the plug ferrule 102 along an optical path (e.g., optical path OP1 and OP2) by total internal reflection. The plug ferrule 102 may be made of a material that is optically transmissive to the wavelength of the optical signals propagating therein. The difference between the index of refraction of the material of the plug ferrule 102 and the index of refraction of an air gap 129 present within the plug ferrule 102 causes the optical signals to reflect off the interior angled wall 127 and propagate along a bent optical path (e.g., BOP1 and BOP2) toward respective lens components (e.g., lens components 122a and 122b). Other means for providing a bent optical path may be utilized. For example, the internal bores may be configured to bend the optical fibers therein such that the optical fibers are directly coupled to the lens components. As described in detail below, the lens components 122a, 122b may be aligned with active optical components of an optical coupling of an electronic device.

With reference now to FIG. 2B, the magnetic coupling surface 104 (i.e., a plug magnetic coupling surface) of the plug ferrule 102 is depicted. In the illustrated embodiment, the magnetic coupling surface 104 opposes the optical coupling surface 103. The magnetic coupling surface 104 may comprise a coded magnetic array 130 (i.e., a plug coded magnetic array) that is operable to be magnetically coupled to a corresponding coded magnetic array of a corresponding mated optical coupling. Each coded magnetic array comprises a plurality of individual magnetic regions, wherein each individual magnetic region has a magnetic polarity associated therewith. The coded magnetic arrays described herein are coded in the sense that the polarity of each magnetic region is in accordance with a magnetic coding pattern such that a first coded magnetic array may only mate with a corresponding coded magnetic array having a magnetic coding pattern that is opposite from the magnetic coding pattern of the first coded magnetic array, and in only one orientation.

In the illustrated embodiment, the coded magnetic array 130 has individual magnetic regions arranged in a grid pattern, wherein the individual magnetic regions have alternating magnetic polarity. As an example and not a limitation, the lightly shaded magnetic regions may have a first magnetic polarity (e.g., individual magnetic region 131), while the darkly shaded magnetic regions may have a second magnetic polarity (e.g., individual magnetic region 132). The magnetic coding pattern is configured to mate with a corresponding magnetic coding pattern of a mated optical coupling. The coded magnetic arrays described herein are not limited to a particular magnetic coding pattern, as any magnetic coding pattern may be utilized.

As described in more detail below, embodiments described herein utilize coded magnetic arrays 130 to provide alignment between the optical components and/or lens components of two mated optical couplings. Use of many individual magnetic regions may allow for random alignment errors of a single magnet-to-magnet coupling relationship to be canceled out. The coded magnetic arrays described herein may allow for optical couplings to self-align with respect to one another.

The coded magnetic array 130 may be configured as a bulk magnetic material that is magnetized to form the desired magnetic regions (e.g., magnetized in-situ). An in-situ magnetizing process is one in which bulk magnetic material is magnetized in precise zones (i.e., desired magnetic regions) in place within the device. In an alternative embodiment, individual magnetic regions of the coded magnetic array 130 may be embedded into the magnetic coupling surface 104 as individual magnets. For example, the magnetic regions may be configured as individual magnets that are maintained within magnet recesses of the magnetic coupling surface 104. In another embodiment, the magnetic regions may be configured as individual magnets that are provided in a molded magnet holder that is then inserted into an opening of the magnetic coupling surface 104.

Any number of magnetic regions may be provided depending on the particular application and the amount of space available. The size of the individual magnetic regions may also depend on the particular application, as well as the number of magnetic regions that define the coded magnetic array and the amount of space available. In one embodiment, each individual magnetic region is between 0.01 to 0.05 mm sq. The greater the number of magnetic regions and the smaller the size of the magnetic regions may provide for greater coupling accuracy. Preferably, the coded magnetic array is flush with respect to the remaining portions of the magnetic coupling surface 104.

Figure 2D:
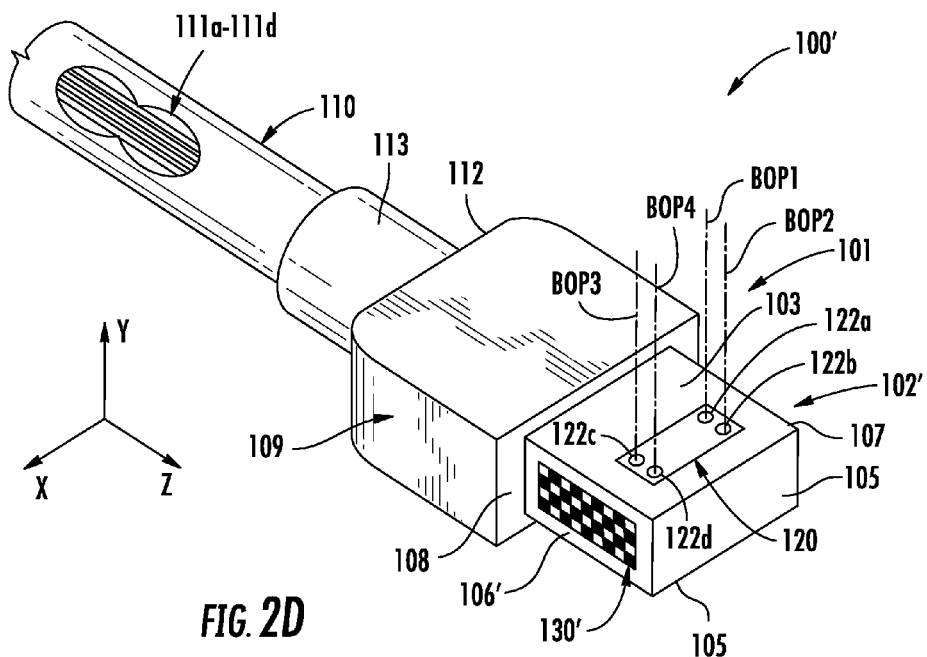
FIG. 2D schematically depicts a top elevated view of an exemplary connector assembly according to one or more embodiments shown and described herein.

Referring now to FIG. 2D, an alternative embodiment of an optical cable assembly 100' in which the magnetic coupling surface 106' is not opposite from the optical coupling surface 103 is illustrated. In this embodiment, the coded magnetic array 130' is located on a side wall 106' of the plug ferrule 102'. Accordingly, the plug ferrule 102' may mate with an optical coupling having a magnetic coupling surface that is not in a plane parallel to an optical coupling surface (i.e., the optical coupling surface of the mated optical coupling may be on a top surface or bottom surface, and the magnetic coupling surface on one of the side walls of a receptacle). More than one coded magnetic array may be utilized to form one or more magnetic coupling surfaces.

Figure 3A:
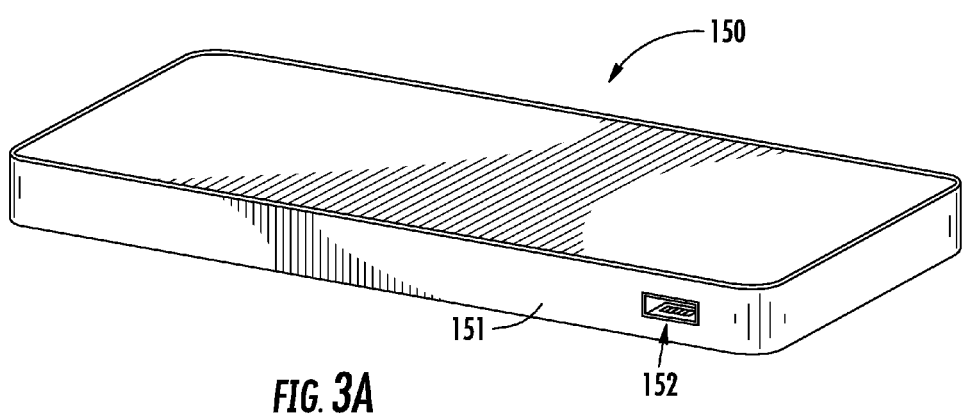
FIG. 3A schematically depicts an elevated view of an exemplary electronic device having an exemplary optical coupling receptacle according to one or more embodiments shown and described herein.

FIG. 3A depicts an exemplary electronic device 150 having an optical coupling 152 configured as a receptacle 152. It should be understood that embodiments are not limited to the location of the receptacle 152 on the electronic device 150, and that the receptacle 152 may be located anywhere on the electronic device 150. As described below, the receptacle 152 is configured to receive a connector assembly of an optical cable assembly, such as the optical cable assembly 100 depicted in FIGS. 1-2D.

Figure 3B:
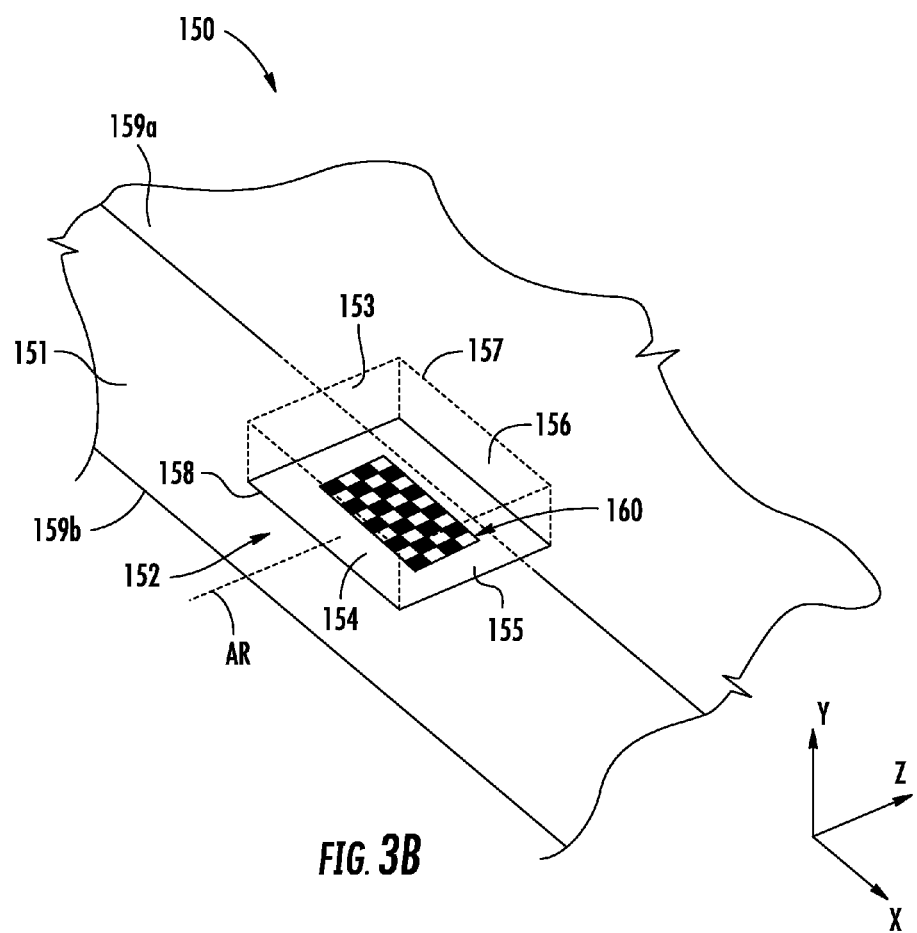
FIG. 3B schematically depicts a bottom, partially transparent elevated view of an electronic device having an exemplary optical coupling receptacle according to one or more embodiments shown and described herein.
Figure 3C:
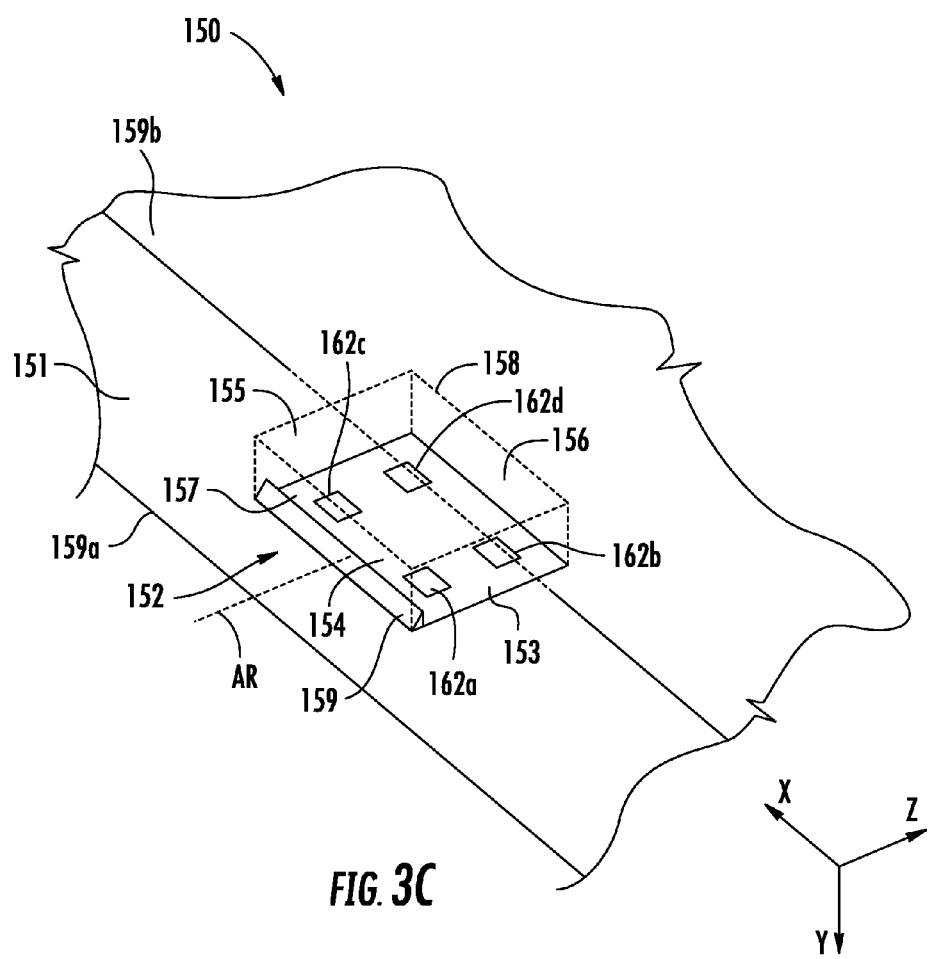
FIG. 3C schematically depicts a top, partially transparent elevated view of an electronic device having an exemplary optical coupling receptacle according to one or more embodiments shown and described herein.

FIGS. 3B and 3C are close-up, partial interior views of the receptacle 152 optical coupling of the electronic device 150 depicted in FIG. 3A. The receptacle 152 comprises a receptacle opening 154 into which the connector assembly 101 may be inserted, as well as a magnetic coupling surface 158 (see FIG. 3B), an optical coupling surface 157 (see FIG. 3C), a first sidewall 153, a second sidewall 155, and a back wall 156. The receptacle 152 has a receptacle axis AR extending from the receptacle opening 154.

Referring specifically to FIG. 3B, the magnetic coupling surface 158 comprises a coded magnetic array 160 having a magnetic coding pattern that is opposite from the magnetic coding pattern of the coded magnetic array 130 of the connector assembly 101 such that the two coded magnetic arrays are magnetically attracted to one another. The coded magnetic array 160 may be fabricated and configured as described above with respect to the connector assembly 101 coded magnetic array 130. The coded magnetic array 160 is preferably flush with respect to the remaining portion of the magnetic coupling surface 158. Although the coded magnetic array 160 is illustrated as being centrally located on the magnetic coupling surface 158, embodiments are not limited thereto. The coded magnetic array 160 may be located at a position that corresponds to the location of the coded magnetic array 130 positioned on the connector assembly 101. Further, the coded magnetic array 160 may be located on the first sidewall 153 or the second sidewall 155. In some embodiments, more than one coded magnetic array may be utilized within the receptacle 152 to form one or more magnetic coupling surfaces.

FIG. 3C depicts the optical coupling surface 157 of the receptacle 152 optical coupling. The optical coupling surface 157 defines an optical interface comprising one or more active optical components (e.g., active optical components 162a-162d) that may be configured as an optical signal transmitting device (e.g., a laser diode, such as a VCSEL laser diode) and an optical signal receiving device (e.g., a photodetector, such as a photodiode) that may make up a transceiver circuit. The number and type of active optical components may depend on the number of optical fibers of the corresponding optical cable assembly and the particular application.

The optical coupling surface 157 may comprise a substrate, such as a printed circuit board substrate, for example, onto which the active optical components 162a-162d may be fixed. The placement of the active optical components on the substrate of the optical coupling surface depends on the location of the lens elements and/or optical fibers of the optical coupling surface 103 of the connector assembly.

In one embodiment, the active optical components 162a-162d are covered with an optically transmissive cover (not shown) to protect the optical components from dust and debris. The optically transmissive cover may include integral lens components for aiding in coupling the optical signals into and out of the active optical components 162a-162d. In another embodiment, no optically transmissive cover is utilized. In yet another embodiment, individual lens components are positioned over each active optical component.

In the illustrated embodiment, an optional wiper element 159 is provided on the optical coupling surface 157 near the receptacle opening 154 to clean the optical coupling surface 103 of the connector assembly 101 as the connector assembly 101 is inserted into the receptacle 152. The wiper element 159 may be a compliant material that moves as the connector assembly 101 is inserted into the receptacle 152. A wiper element may also be provided at the first sidewall 153, the second sidewall 155, and the magnetic coupling surface 158 near the receptacle opening 154 of the receptacle to clean all surfaces of the connector assembly 101.

Figure 4A:
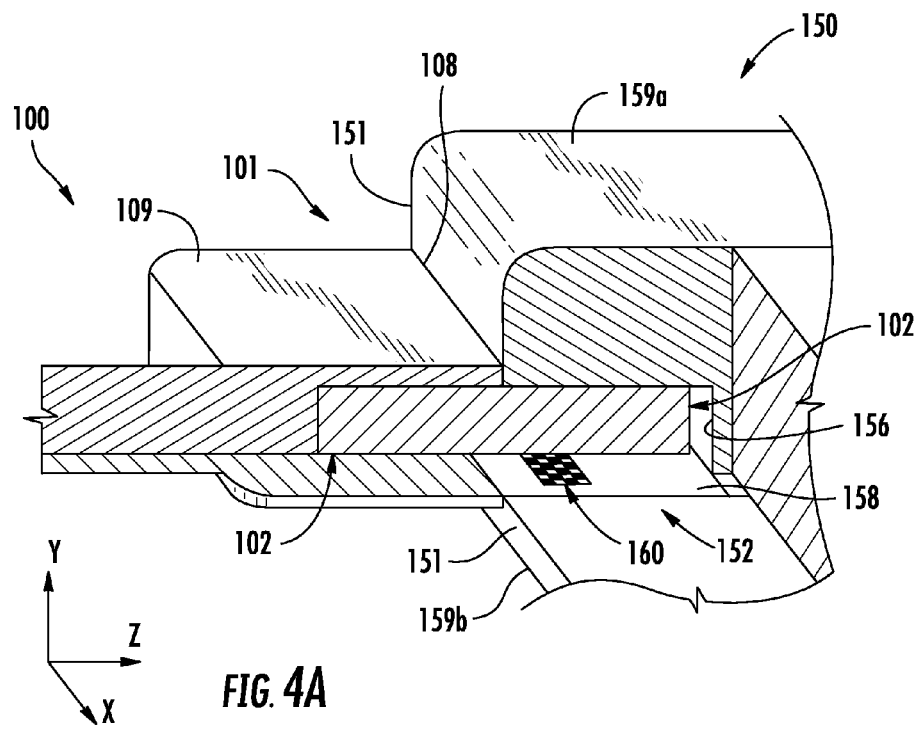
FIG. 4A schematically depicts a top, cross-sectional elevated view of an exemplary connector assembly inserted into an exemplary optical coupling receptacle of an electronic device according to one or more embodiments shown and described herein.

FIG. 4A depicts a cross-sectional, elevated view of a connector assembly 101 coupled to a receptacle 152 via mated coded magnetic arrays 130 and 160. As the user inserts the plug ferrule 102 into the receptacle opening 154 of the receptacle 152, the coded magnetic array 130 (not visible in FIG. 4A) of the plug ferrule 102 is magnetically attracted to the coded magnetic array 160 of the receptacle 152 such that the plug ferrule 102 is securely and precisely positioned within the receptacle 152 along the x-, y- and z-axes. The magnetic coding pattern of the two coded magnetic arrays may be coded such that the coded magnetic array 130 of the plug ferrule 102 is free to be moved across the coded magnetic array 160 of the receptacle along the z-axis until the two coded magnetic arrays are in approximate physical alignment. In other words, the magnetic coding patterns should not be such that the coded magnetic array 130 of the plug ferrule 102 is prematurely coupled to the coded magnetic array 160 of the receptacle along the z-axis. The two coded magnetic arrays should only be magnetically attracted to one another at one mating arrangement.

The receptacle 152 may be dimensioned such that the plug ferrule 102 of the connector assembly 101 has some freedom of movement within the receptacle 152 to allow the plug ferrule 102 to move along the x-, y- and z-axes and be precisely positioned by the mated coded magnetic arrays. The plug ferrule 102 may be securely mated with the receptacle by magnetic force.

Figure 4B:
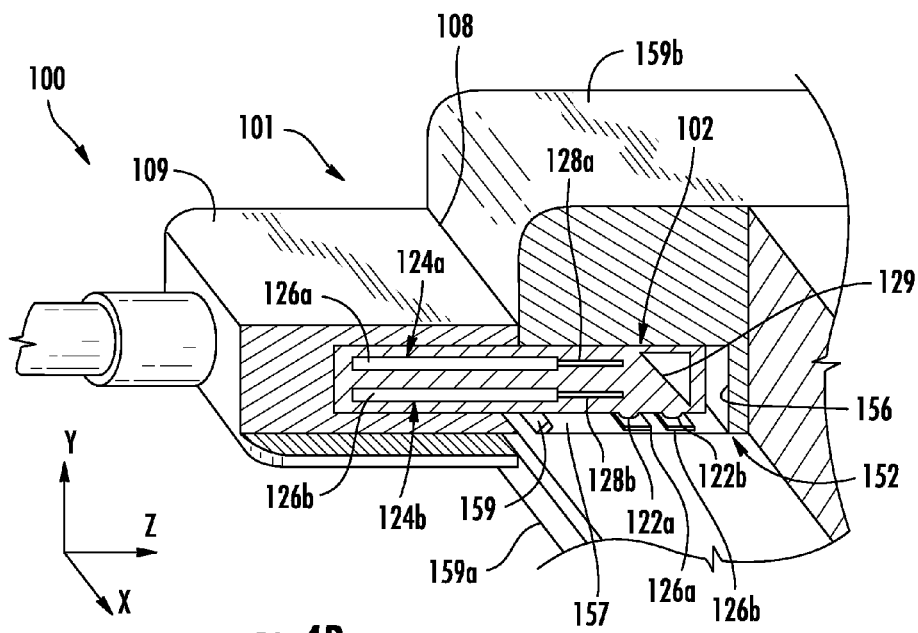
FIG. 4B schematically depicts a bottom, cross-sectional elevated view of an exemplary connector assembly inserted into an exemplary optical coupling receptacle of an electronic device according to one or more embodiments shown and described herein.

FIG. 4B depicts a cross-sectional, elevated view of an optical coupling surface 157 of the connector assembly 101 and the receptacle depicted in FIG. 4A. The mated coded magnetic arrays 130, 160 substantially align the lens components 122a, 122b of the plug ferrule 102 to the active optical components 162a, 162b of the receptacle 152, respectively (as well as lens components 122c and 122d to active optical components 162c and 162d, not shown in FIG. 4B). The lens components are substantially aligned with respect to the active optical components along the x- and z-axes by the mated coded magnetic arrays, while the dimensions of the plug ferrule 102 and the receptacle 152 substantially position the lens components with respect to the active components at a known position along the y-axis. In this manner, the ends of the optical fibers within the plug ferrule are precisely positioned along x-, y-, and z-axes with respect to active optical components within the receptacle by magnetic force to provide for an optical coupling that is relatively clean and does not require complicated and expensive mechanical features that may cause the build-up of dust and debris.

Figure 5A:
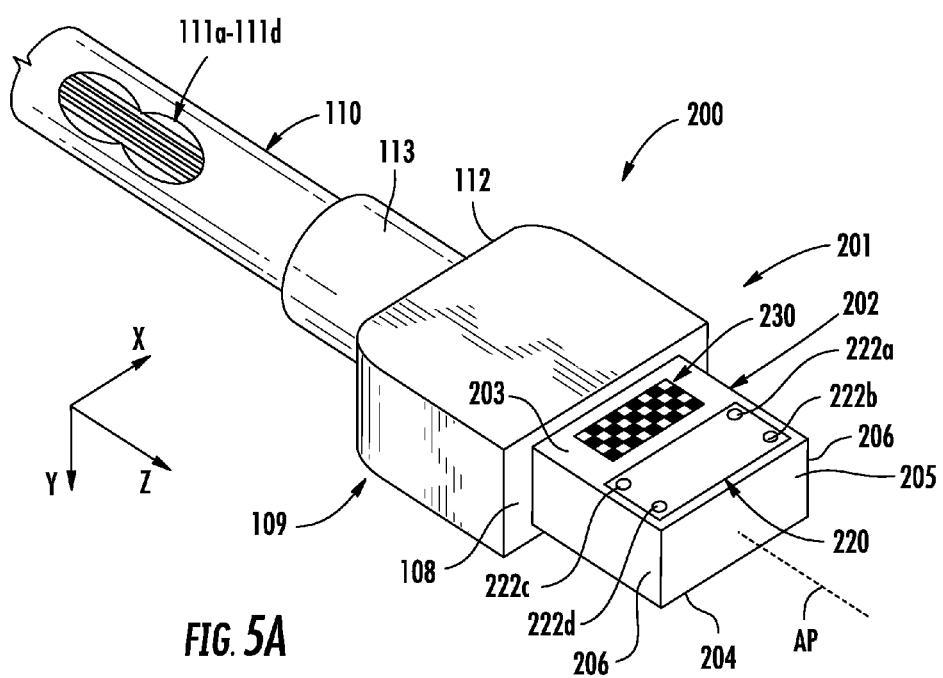
FIG. 5A schematically depicts a bottom, elevated view of an exemplary connector assembly according to one or more embodiments shown and described herein.
Figure 5B:
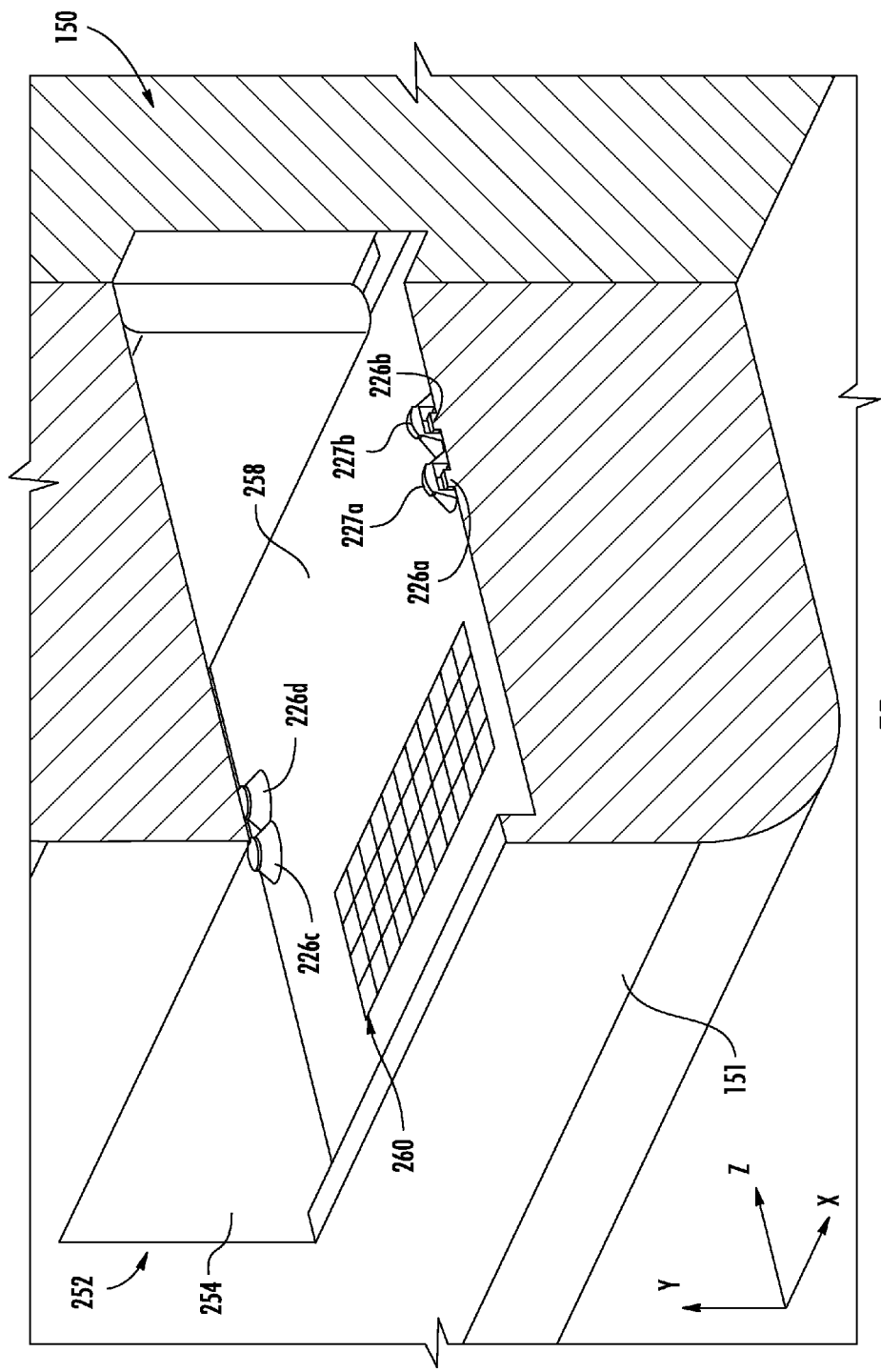
FIG. 5B schematically depicts a top, cross-sectional elevated view of an electronic device having an exemplary optical coupling receptacle according to one or more embodiments shown and described herein.

Referring now to FIGS. 5A and 5B, optical couplings configured as a plug or a receptacle may have one or more optical interfaces and one or more coded magnetic arrays located on a single coupling surface. FIG. 5A is a bottom-up, elevated view of a connector assembly 201 of an optical cable assembly 200 having an optical interface 220 and a coded magnetic array 230 on a single coupling surface 203 (e.g., the bottom surface of a plug ferrule 202 in the illustrated embodiment). In the illustrated embodiment, the optical interface 220 is positioned near the front of the plug ferrule 202 (i.e., near front face 205), while the coded magnetic array is located near the rear of the plug ferrule 202 (i.e., near the front end 108 of the connector housing 109). The optical interface 220 may comprise one or more lens components within an optical transmissive face, such as lens components 222a-222d. In the illustrated embodiment, first and second lens components 222a, 222b are located proximate a first side of the plug ferrule 202, and third and fourth lens components 222c, 222d are located proximate a second side 206 of the plug ferrule 202. Embodiments are not limited to the number and location of lens components depicted in FIG. 5A, as any number of lens components may be positioned at any number of locations on the coupling surface. The lens components 222a-222d and the coded magnetic array 230 may be configured as those described herein.

It should be understood that embodiments are not limited to the configuration depicted in FIG. 5A, as many other variations are possible. As an example and not a limitation, the locations of the optical interface 222 and the coded magnetic array 230 may be reversed from what is depicted in FIG. 5A. Additionally, more than one optical interface and/or more than one coded magnetic array may be provided. Although the optical interface 220 is illustrated as a single optical interface in FIG. 5A, each lens component 222a-222d may be an optical interface, or first and second lens components 222a, 222b may make up a first and second optical interface, and third and fourth lens components 222c, 222d may make up a second optical interface, etc.

As described in more detail below with respect to FIG. 6F, optical signals propagating within optical fibers 111a-111d are redirected within the plug ferrule 202. In the illustrated embodiment, the optical signals are redirected by 90 degrees within the plug ferrule 202 with respect to the single coupling surface 203.

Referring now to FIG. 5B, a cross-sectional, elevated view of an electronic device 150 having an optical coupling configured as a receptacle 252 is illustrated. The optical coupling receptacle 252 depicted in FIG. 5B is similar to the receptacle 152 depicted in FIGS. 4A and 4B, except that the active optical components 226a-226d that define the optical interface are located on the same coupling surface 258 as the coded magnetic array 260. The optical coupling receptacle 252, which has an opening 254 at a coupling face 151 of the electronic device 150, is configured to receive the plug ferrule 202 of the connector assembly 201 depicted in FIG. 5A. In the illustrated embodiment, the active optical components 226a-226d are located at the rear of the optical coupling receptacle 252, while the coded magnetic array 260 is located near the opening 254. The placement and configuration of the active optical components 226a-226d and the coded magnetic array 260 are configured for mating with the lens components 222a-222b and the coded magnetic array 230 of the plug ferrule 202 depicted in FIG. 5A. Other configurations are possible.

In the embodiment depicted in FIG. 5B, each active optical component 226a-226d has a lens component 227a-227d associated therewith. The lens components 227a-227d are configured to expand or focus the optical signals to enhance optical coupling between the active optical components 226a-226d and the lens components 222a-222d/optical fibers of the connector assembly 201. The lens components 222a-222d may be configured as a single transmissive lens component assembly that is positioned on the coupling surface 258, or as individual lens components as illustrated in FIG. 5B. In an alternative embodiment, no lens components are used.

Figure 6A:
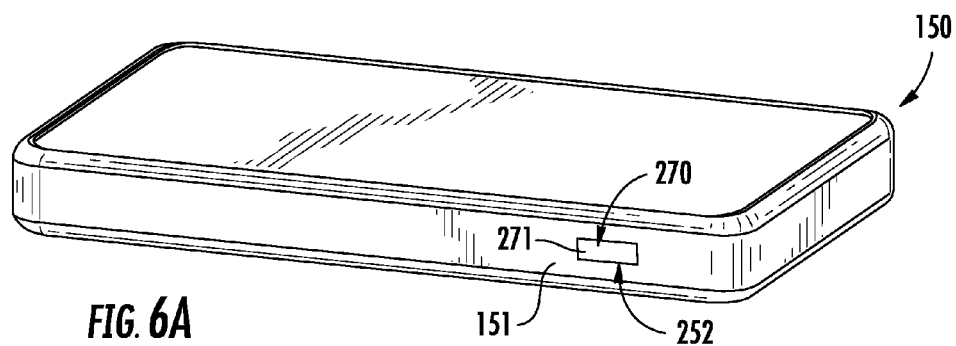
FIG. 6A schematically depicts a top elevated view of an electronic device having an exemplary optical coupling receptacle with a translating shutter assembly in a closed position according to one or more embodiments shown and described herein.
Figure 6B:
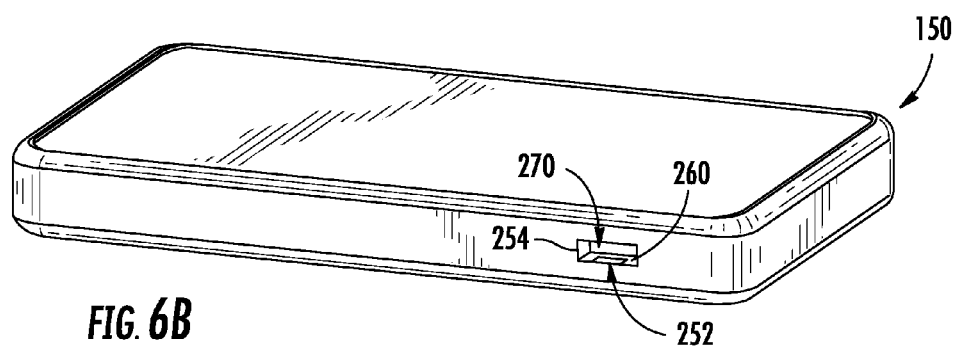
FIG. 6B schematically depicts a top elevated view of the electronic device depicted in FIG. 6A with the translating shutter assembly in a partially retracted position according to one or more embodiments shown and described herein.

Referring now to FIG. 6A-6E, the optical coupling receptacle of some embodiments may have a translating shutter assembly 270 positioned therein to close the opening of the optical coupling receptacle 252 when the connector assembly is not coupled to the electronic device 150. FIG. 6A depicts an electronic device 150 having an optical coupling receptacle 252 with a translating shutter assembly 270 in a closed position (i.e., an unretracted state) such that a front surface 271 of the translating shutter assembly 270 is substantially flush with a coupling face 151 (e.g., a side wall of the electronic device 150). In this state, the translating shutter assembly 270 may prevent liquid, dust, and other foreign substances from entering the receptacle and impeding the optical coupling of the connector assembly to the receptacle. FIG. 6B depicts the translating shutter assembly 270 in a partially retracted state, thereby exposing the coded magnetic array 260. As described in detail below, the translating shutter body 270 may protect the optical interface from foreign substances by closing the optical coupling receptacle 252 and also wipe the lens components 227a-227d (or the active optical components 226a-226d in embodiments that do not utilize lens components) with a wiper element associated with the translating shutter body 270.

Figure 6C:
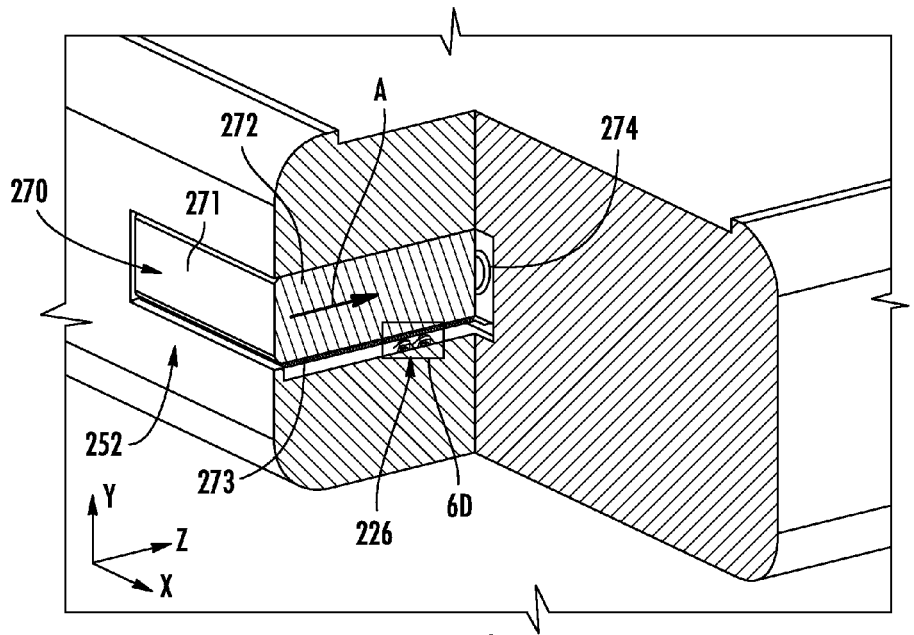
FIG. 6C schematically depicts a top, cross-sectional elevated view of an electronic device having an exemplary optical coupling receptacle with a translating shutter assembly according to one or more embodiments shown and described herein.

FIG. 6C is a close-up, cross-sectional view of an optical coupling receptacle 252 having a translating shutter assembly 270 therein. The translating shutter assembly 270 of the illustrated embodiment comprises a shutter body 272 having a front face 271, a wiper element 273 positioned on a wiper surface of the shutter body 272, and a bias member 274. The bias member 274, which may be positioned behind the shutter body 272, provides a bias to maintain the translating shutter assembly 270 in an unretracted, closed state when there is no force against the front face 271 of the shutter body 272. The bias member 274 may be configured as one or more springs in one embodiment. Any structure capable of providing a bias may be utilized.

A force exerted on the front face 271 of the shutter body 272 may translate the translating shutter assembly 270 in the direction as indicated by arrow A, such that the translating shutter assembly 270 is moved into the interior of the electronic device 150. The translating shutter assembly 270 may optionally include guide structures (not shown) to guide the shutter body 272 into and out of the optical coupling receptacle 252. The force on the front face 271 may be provided by a plug ferrule of a connector assembly as a user inserts the plug ferrule into the receptacle.

Figure 6D:
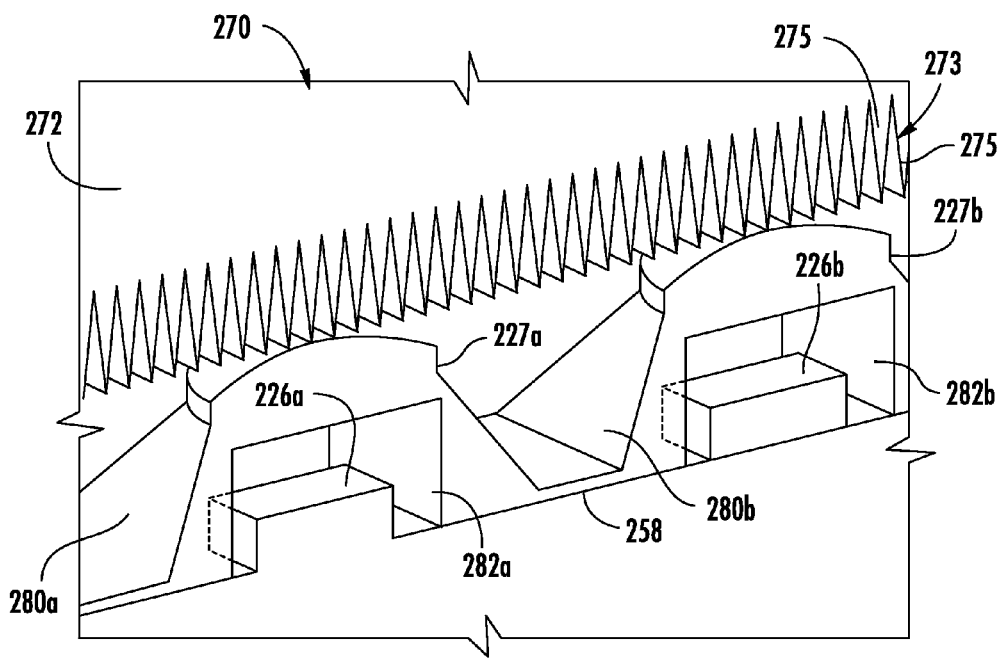
FIG. 6D schematically depicts a close-up view of a wiper element, lens components, and active optical components of the optical coupling receptacle depicted in FIG. 6C according to one or more embodiments shown and described herein.

As the translating shutter assembly 270 is translated within the optical coupling receptacle 252, the wiper element 273 is brushed across the lens components 227 to clean the lens components 227 by wiping away foreign substances. FIG. 6D is a close-up, cross-sectional view of the region indicated as B in FIG. 6C. It is noted that FIG. 6D does not include cross-hatching to more clearly depict the first and second active optical components 226a, 226b, the first and second lens components 227a, 227b, and the wiper element 273. The illustrated wiper element 273 comprises a plurality of compliant or semi-compliant fingers 275 extending along a width of the shutter body 272. The fingers 275 may brush against the lens elements as the wiper element 273 is translated within the receptacle. The fingers 275 may be made of any material that is compliant or semi-compliant and effectively removes foreign substances from the lens components. Other configurations for the wiper element 273 are also possible. As an example and not a limitation, the fingers 275 may be rectangular in cross-section rather than triangular. As other nonlimiting examples, the wiper element 273 may not include figures, but rather a continuous surface of a wiper material, such as a micro-fiber material, or the wiper element may be comprised of a plurality of bristles.

Still referring to FIG. 6D, the illustrated first and second lens components 227a, 227b are associated with a first and second lens pedestal 280a, 280b, respectively. The lens pedestals define an enclosure (e.g., enclosure 282a of the first lens pedestal 280a, and enclosure 282b of the second lens pedestal 280b) in which one or more active optical components may be positioned (e.g., the first active optical component 226a and the second active optical component 226b). The configuration and the arrangement of the lens components are such that the optical signals are focused/expanded into/out of the active optical components. The lens pedestals may be made of a material that is transmissive to the optical signal passing through the lens components. In one embodiment, the lens component and the lens pedestal are a single component. In another embodiment, the lens component is a separate component that is mounted on the lens pedestal.

Figure 6E:
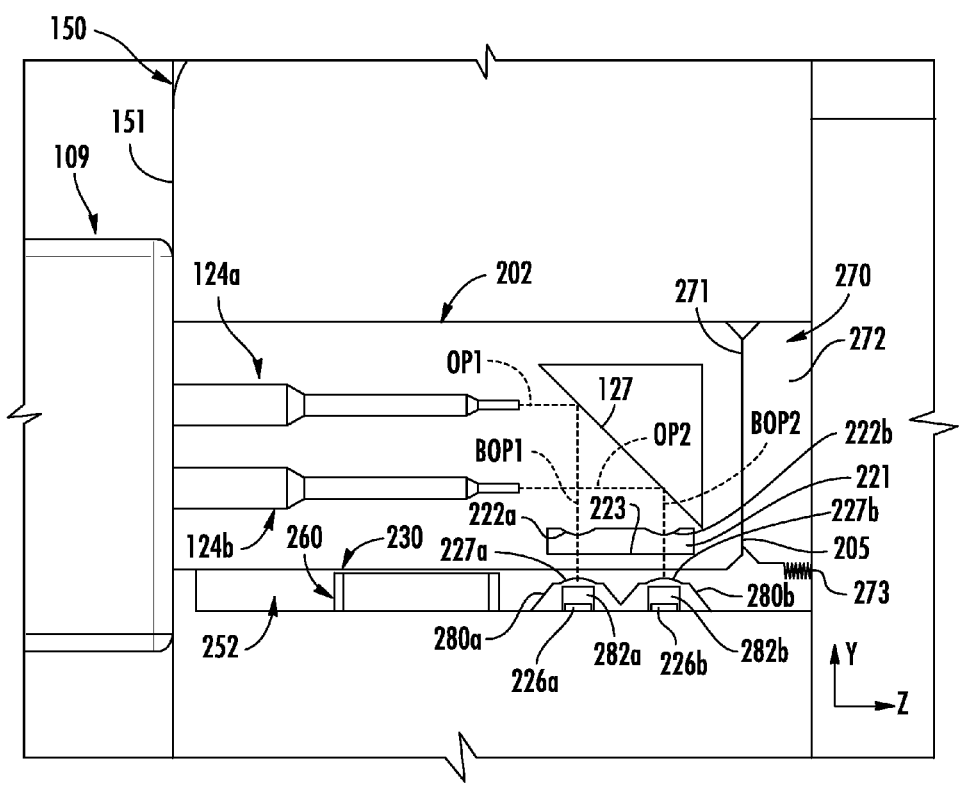
FIG. 6E schematically depicts a cross-sectional view of a plug ferrule positioned in an optical coupling receptacle of an electronic device according to one or more embodiments shown and described herein.

FIG. 6E illustrates a side view of a translating shutter assembly 270 in retracted position and a plug ferrule 202 positioned within an optical coupling receptacle 252. The plug ferrule 202 may generally comprise internal fiber bores (e.g., first fiber bore 124a and second fiber bore 124b), a reflective interior angled wall 127 and lens components (e.g., first lens component 227a and second lens component 227b) as described above and illustrated in FIG. 2C. In the embodiment depicted in FIG. 6E, the lens components are internal to the plug ferrule 202 and not exposed to an outer surface. The plug ferrule 202 has a transmissive portion 223 that may define an optically transmissive face of the optical interface 220 (see FIG. 5A). The transmissive portion 223 may be offset from the lens components (e.g., first lens component 222a and second lens component 222b) such that there is a gap 221 within the plug ferrule 204. The lens components of the plug ferrule and the lens components of the optical coupling receptacle optically couple the ends of optical fibers within the plug ferrule to active optical components on the coupling surface 258 of the optical coupling receptacle.

As a user presses the front face 205 of the plug ferrule 202 against a front surface 271 of the shutter body 272, the translating shutter assembly 270 is moved back into the electronic device 150 while the plug ferrule 202 is moved into the optical coupling receptacle 252. The wiper element 273 is dragged across the lens components of the optical coupling receptacle 252. The coded magnetic array 230 of the plug ferrule 202 is magnetically coupled to the coded magnetic array 260 of the optical coupling receptacle 252 when the two corresponding coded magnetic arrays are in close proximity to one another. As described above, the magnetically coupled coded magnetic arrays precisely align the lens components of the plug ferrule (e.g., first lens component 222a and second lens component 222b) with the lens components of the optical coupling receptacle 252 (e.g., first lens component 227a and second lens component 227b). To disconnect the plug ferrule 202 from the optical coupling receptacle 252, the user pulls back on the connector housing 109 to decouple the coded magnetic arrays 230, 260 and remove the plug ferrule 202 from the optical coupling receptacle 252. The bias member 274 (not shown in FIG. 6E) then provides a spring force on the shutter body 272 to return the translating shutter assembly 270 to an unretracted state and close the optical coupling receptacle 252.

Configurations other than those described above and illustrated throughout the figures are also possible. Optical couplings having more than one magnetic coupling surface may also be provided. Further, devices other than optical cable assemblies may have optical couplings for connection to an electronic device. For example, two electronic devices may be directly coupled together using the embodiments described and illustrated herein. One electronic device may have a male-type optical coupling configured as a plug ferrule and one may have a female-type optical coupling configured as the receptacle.

It is noted that terms like "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "approximately" and "about" are utilized herein to represent the inherent degree of uncertainty that may be attributed to any quantitative comparison, value, measurement, or other representation.

The invention claimed is:

1. An optical coupling comprising:
an optical coupling body;
an optical interface located at the optical coupling body, and the optical interface is within an optical coupling surface of the optical coupling body; and
a coded magnetic array located at the optical coupling body, the coded magnetic array having a plurality of magnetic regions configured for mating the optical interface, and the coded magnetic array is within a magnetic coupling surface of the optical coupling body, wherein the magnetic coupling surface is disposed on a different sidewall than the optical coupling surface; and
a reflective surface within the optical coupling body and positioned along an optical path of the optical coupling body, the reflective surface being operable to redirect an optical signal propagating within the optical coupling body such that the optical signal propagates through the optical interface.

2. The optical coupling of claim 1, wherein the reflective surface is angled such that the optical signal is redirected in a direction that is substantially orthogonal to the optical interface.

3. The optical coupling of claim 1, wherein the reflective surface is configured to redirect the optical signal by total internal reflection.

4. The optical coupling of claim 1, wherein the magnetic coupling surface is opposite from the optical coupling surface.

5. The optical coupling of claim 1, wherein the magnetic coupling surface is orthogonal with respect to the optical coupling surface.

6. The optical coupling of claim 1, wherein the plurality of magnetic regions of the coded magnetic array are arranged in a grid pattern.

7. The optical coupling of claim 1, wherein the coded magnetic array has a magnetic coding pattern defined by the plurality of magnetic regions having a first magnetic polarity or a second magnetic polarity.

8. The optical coupling of claim 1, wherein the optical interface comprises an optically transmissive face and an optical component.

9. The optical coupling of claim 8, wherein the coded magnetic array aligns the optical component to a mated optical component of a mated optical coupling.

10. The optical coupling of claim 8, wherein the optical component comprises an optical fiber end.

11. The optical coupling of claim 1, wherein:
the coded magnetic array comprises a bulk magnetic material; and
the plurality of magnetic regions of the coded magnetic array are magnetized within the bulk magnetic material according to a magnetic coding pattern.

12. The optical coupling of claim 1, wherein the optical coupling body is configured as a plug ferrule that forms a portion of a connector plug.

13. The optical coupling of claim 1, further comprising a fiber bore within the optical coupling body that is parallel to the optical interface, wherein the fiber bore is operable to receive an optical fiber.

14. The optical coupling of claim 1, wherein the optical interface further comprises a lens component.

15. The optical coupling of claim 14, further comprising an optical fiber within the optical coupling body, wherein the optical fiber comprises an end that is optically coupled to the lens component.

16. A connector assembly comprising:
a plug ferrule comprising:
an optical interface located at an optical coupling surface of the plug ferrule;
a coded magnetic array having a plurality of magnetic regions for mating the optical interface, and the coded magnetic array is located at a magnetic coupling surface of the plug ferrule, wherein the magnetic coupling surface is disposed on a different sidewall from the optical coupling surface;
a fiber bore within the plug ferrule;
a reflective surface within the plug ferrule and positioned along an optical path extending from the fiber bore, the reflective surface being operable to redirect an optical signal propagating within the plug ferrule such that the optical signal propagates through the optical interface; and
a fiber optic cable coupled to the plug ferrule, the fiber optic cable comprising an optical fiber positioned within the fiber bore of the plug ferrule.

17. The connector assembly of claim 16, wherein the magnetic coupling surface is opposite from the plug ferrule.

18. The connector assembly of claim 16, wherein the magnetic coupling surface is orthogonal with respect to the plug ferrule.

19. The connector assembly of claim 16, further comprising a connector housing, wherein the plug ferrule extends from the connector housing.

* * * * *